(12) United States Patent
Sakai

(10) Patent No.: US 7,726,368 B2
(45) Date of Patent: Jun. 1, 2010

(54) PNEUMATIC TIRE WITH TREAD HAVING SHALLOW GROOVE EXTENDING BETWEEN ZIGZAG SIPES

(75) Inventor: Tomonori Sakai, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/304,416

(22) PCT Filed: Dec. 13, 2007

(86) PCT No.: PCT/JP2007/074059

§ 371 (c)(1),
(2), (4) Date: Dec. 11, 2008

(87) PCT Pub. No.: WO2008/087815

PCT Pub. Date: Jul. 24, 2008

(65) Prior Publication Data

US 2009/0151833 A1 Jun. 18, 2009

(30) Foreign Application Priority Data

Jan. 17, 2007 (JP) .............................. 2007-007709

(51) Int. Cl.
*B60C 11/12* (2006.01)
(52) U.S. Cl. .............................. 152/209.15; 152/209.8; 152/209.18; 152/DIG. 3
(58) Field of Classification Search ............ 152/209.15, 152/209.18, DIG. 3, 209.8
See application file for complete search history.

(56) References Cited

U.S. PATENT DOCUMENTS

| 6,619,352 | B2 * | 9/2003 | Diensthuber et al. ... | 152/DIG. 3 |
| 2002/0007889 | A1 * | 1/2002 | Eromaki ................. | 152/209.17 |
| 2008/0135150 | A1 * | 6/2008 | Kiwaki et al. .......... | 152/209.25 |

FOREIGN PATENT DOCUMENTS

| JP | A 3-186407 | 8/1991 |
| JP | A 9-328004 | 12/1997 |
| JP | A 10-24707 | 1/1998 |
| JP | A 11-321240 | 11/1999 |
| JP | A 2003-154527 | 5/2003 |
| JP | 2006-151222 | * 6/2006 |
| JP | 2006-151227 | * 6/2006 |
| JP | A 2006-151227 | 6/2006 |
| JP | A 2006-298055 | 11/2006 |

* cited by examiner

*Primary Examiner*—Steven D Maki
(74) *Attorney, Agent, or Firm*—Grrer, Burns & Crain, Ltd.

(57) ABSTRACT

A pneumatic tire includes a shallow groove provided between zigzag sipes adjacent in the circumferential direction of the tire, which can reduce production cost of the mold, facilitate trimming operation and decrease waste from trimming while reduction of driving stability during turning on a wet road surface and occurrence of curing trouble are suppressed. The pneumatic tire has a tread surface where land portions are defined by grooves. The land portions have tread surface sections, in which a plurality of sipes extending in a zigzag manner in the widthwise direction of the tire are arranged at prescribed intervals in the circumferential direction of the tire. A shallow groove extends between adjacent sipes. The shallow groove is placed such that parts of land portions sectioned on the opposite sides of the shallow groove are not separated, but partially communicate with each other.

3 Claims, 2 Drawing Sheets

US 7,726,368 B2

PNEUMATIC TIRE WITH TREAD HAVING SHALLOW GROOVE EXTENDING BETWEEN ZIGZAG SIPES

This application is a U.S. National Phase under 35 U.S.C. §371 of International Application No. PCT/JP2007/074059, filed Dec. 13, 2007.

TECHNICAL FIELD

The present invention relates to a pneumatic tire, a tire mold used for production of the pneumatic tire and a method of producing the pneumatic tire with the tire mold, and more particularly, to a pneumatic tire, a tire mold and a method of producing the pneumatic tire capable of reducing production cost of the mold and facilitating trimming operation while reduction of driving stability during turning on a wet road surface and occurrence of curing trouble are suppressed.

TECHNICAL BACKGROUND

A conventional pneumatic tire used in winter has sipes in land portions such as blocks and ribs. The sipes, which extend in the widthwise direction of the tire in a zigzag path, are provided at prescribed intervals in the circumferential direction of the tire. High on-ice performance is achieved by an edge effect arising from the sipes (see a patent document 1, for example).

In the above pneumatic tire, a technique of providing a shallow groove between zigzag sipes adjacent in the circumferential direction of the tire is employed in order to improve driving stability during turning on a wet road surface, the shallow groove communicating with the zigzag sipes (see a patent document 2, for example). Driving stability during turning on a wet road surface is enhanced by an edge effect arising from the shallow groove extending in the circumferential direction of the tire while a decrease in land portion stiffness is suppressed by reducing the depth of the groove to thereby suppress reduction of driving stability on a dry road surface.

However, the tire having a structure as mentioned above needs to use a tire mold which has a venthole for air release in each part of the inner surface of the tire mold corresponding to a part of a land portion sectioned by the sipes and shallow groove in order to prevent occurrence of curing trouble arising from an air pocket. Therefore, a lot of bentholes must be formed in the mold. As a result, a production time of the mold is consumed, which creates a problem of an increase in mold production cost.

There is also a problem of troublesome spew-trimming operation and a lot of waste from trimming, because tire producing processes include a process of trimming spews formed on the surface of a tire by rubber flown into bentholes, and when the bentholes increase, the number of the spews increases.

Patent Document 1: Japanese Patent Application Kokai Publication HEI 10-24707
Patent Document 2: Japanese Patent Application Kokai Publication HEI 11-321240

DISCLOSURE OF THE INVENTION

Problems to be Solved by the Invention

An object of the present invention is to provide a pneumatic tire having a shallow groove provided between zigzag sipes adjacent in the circumferential direction of the tire, a tire mold used for production of the pneumatic tire and a method of producing the pneumatic tire with the tire mold, which can reduce production cost of the mold, facilitate trimming operation and decrease waste from trimming while reduction of driving stability during turning on a wet road surface and occurrence of curing trouble are suppressed.

Means for Solving the Problems

In order to achieve the above object, the pneumatic tire of the present invention has a tread surface, land portions defined by a groove being provided in the tread surface, the land portions having a tread surface section, a plurality of sipes extending in a zigzag manner in a widthwise direction of the tire being arranged in the tread surface section at prescribed intervals in a circumferential direction of the tire, a shallow groove extending between sipes adjacent in the circumferential direction of the tire, the shallow groove being placed such that parts of the land portions sectioned on opposite sides of the shallow groove are not separated but partially communicate with each other.

The tire mold of the present invention has a molding surface for molding a tread portion, the molding surface having mold surface sections defined by a groove molding ridge protruding therefrom, a plurality of sipe molding blades extending in a zigzag manner in a widthwise direction of the mold being arranged at prescribed intervals in a circumferential direction of the mold on the mold surface sections, a shallow groove molding ridge extending between sipe molding blades adjacent in the circumferential direction of the mold, the shallow groove molding ridge being placed such that parts of the mold surface sections sectioned on opposite sides of the shallow groove molding ridge are not separated but partially communicate with each other.

The method of producing a pneumatic tire according to the present invention has a step of curing a green tire in the above tire mold.

Effect of the Invention

According to the present invention mentioned above, the shallow groove extending between the sipes adjacent in the circumferential direction of the tire is disposed such that the land portion parts sectioned on the opposite sides of the shallow groove are not separated but partially communicate with each other, whereby it is possible to escape air trapped in the parts of the molding surface section sectioned on the opposite sides of the shallow groove molding ridge outside from the one venthole through the communicating part, that is, a communicating part of the tire mold during curing of the tire in the tire mold. Accordingly, while mold production cost is reduced by remarkably reducing the number of ventholes formed in the tire mold, occurrence of curing trouble due to an air pocket can be suppressed.

By decreasing the number of ventholes, the number of spews formed on the surface of the tire by rubber flown into the bentholes is reduced. Therefore, spew-trimming operation can be facilitated and waste from trimming can also be reduced.

It is sufficient for the land portion parts to partially communicate with each other. Therefore, the shallow groove can obtain an enough length. Accordingly, reduction of driving stability during turning on a wet road surface can be suppressed.

Figure 1:
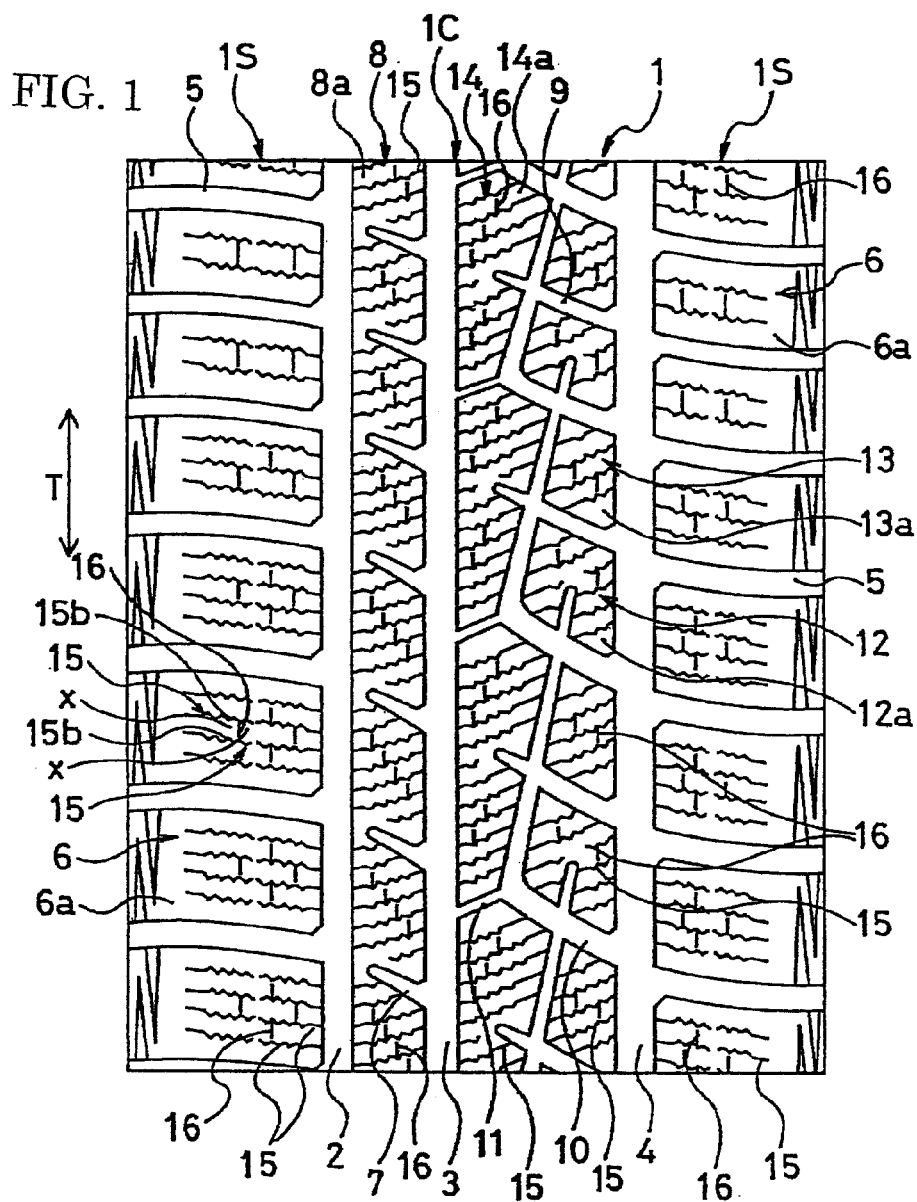
FIG. 1 is a partial development view of a tread surface showing an embodiment of a pneumatic tire according to the present invention.

DESCRIPTION OF THE SYMBOLS 1 tread surface
2, 3, 4 main groove
5, 7, 9, 10 lateral groove
6, 8, 12, 13, 14 land portion
6a, 8a, 12a, 13a, 14a tread surface section
15 sipe
16a concave part
15b convex part
16 shallow groove
16a one terminal end
16b the other terminal end
21 molding surface
21A molding surface section
22, 23, 24 main groove molding ridge
25, 27, 29, 30 lateral groove molding ridge
35 sipe molding blade
35a concave part
35b convex part
36 shallow groove molding ridge
36a one terminal end
36b the other terminal end
37 venthole
L shallow groove length
M mold circumferential direction
Q shallow groove molding ridge length
T tire circumferential direction
d distance
k communicating part
x land portion part
y molding surface section part

BEST MODES FOR CARRYING OUT THE INVENTION

Embodiments of the present invention will be described in detail below with reference to the attached drawings.

Referring to FIG. 1, there is shown an embodiment of a pneumatic tire according to the present invention; reference numeral 1 denotes a tread surface. Three main grooves 2, 3 and 4 extending in the circumferential direction T of the tire are provided in the tread surface 1. First lateral grooves 5, which extend from the main grooves 2 and 4 located on the opposite outer sides outward in the widthwise direction of the tire beyond ground contact ends of the tire, are disposed at prescribed intervals in the circumferential direction T of the tire. Land portions 6 formed from blocks are defined by the main grooves 2 and 4 and the first lateral grooves 5 in both shoulder regions 1S of the tread surface 1.

Second lateral grooves 7, which extend in the widthwise direction of the tire from the main groove 3 located in a center region 1C between the main grooves 2 and 4 toward the main groove 2, are disposed at prescribed intervals in the circumferential direction T of the tire. The second lateral grooves 7 do not communicate with the main groove 2. A land portion 8 formed from a rib is defined by the main grooves 2 and 3 between the main grooves 2 and 3.

Third lateral grooves 9 and fourth lateral grooves 10 are alternately disposed at prescribed intervals in the circumferential direction T of the tire, the third lateral grooves 9 extending straight from the main groove 4 inward in the widthwise direction of the tire, the fourth lateral grooves 10 extending in a curved manner. A narrow groove 11 extends between each fourth lateral groove 10 and the main groove 3. Land portions 12, 13 and 14 formed from blocks different in shape are defined by the main grooves 3 and 4, lateral grooves 9 and 10, and narrow groove 11 between the main grooves 3 and 4.

The land portions 6, 8, 12, 13 and 14 respectively have tread surface sections 6a, 8a, 12a, 13a and 14a, in which a plurality of sipes 15 extending in a zigzag path in the widthwise direction of the tire are arranged at prescribed intervals in the circumferential direction T of the tire. Sipes 15 provided in the land portions 8, 12, 13 and 14 located in the center region 1C of the tread surface 1 extend in the widthwise direction of the tire in an inclined manner toward one side with respect to the widthwise direction of the tire. Sipes 15 provided in the land portions 6 located in the shoulder regions 1S extend in the widthwise direction of the tire in an inclined manner toward the other side with respect to the widthwise direction of the tire.

A shallow groove 16 extending in a straight manner is provided between two given sipes 15 and 15 adjacent in the circumferential direction T of the tire. The shallow groove 16 may be provided between each pair of sipes adjacent in the circumferential direction T of the tire, but can be properly disposed at each of desired locations as shown in FIG. 1. The shallow groove 16 has one terminal end which is connected to one sipe 15 and the other terminal end which is away from the other sipe 15.

Figure 2:
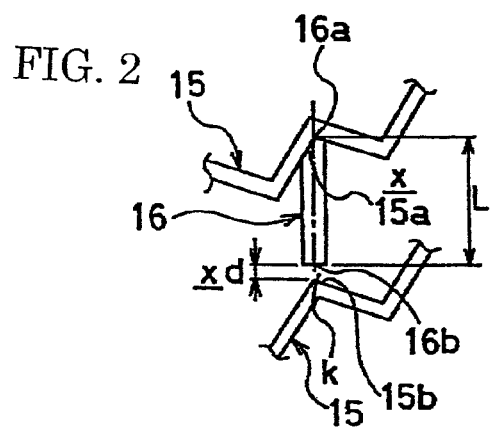
FIG. 2 is a partial enlarged view of a tread surface section of a land portion.

More specifically, there are provided shallow grooves 16, and as shown in FIG. 2, some of the shallow grooves 16 are each disposed between a concave part 15a of one sipe 15 of the two sipes 15 and 15 adjacent in the circumferential direction T of the tire, and a convex part 15b of the other sipe 15 thereof. Each shallow groove 16 has one terminal end 16a connected to the concave part 15a of the one sipe 15, and the other terminal end 16b away from the convex part 15b of the other sipe 15. Parts x and x of each land portion sectioned on the opposite sides of the shallow groove 16 are not separated by the shallow groove 16, but partially communicate with each other between the other terminal end 16b of the shallow groove 16 and the convex part 15b of the other sipe 15.

As shown in FIG. 1, the others of the shallow grooves 16 are each disposed between a convex part 15b of the one sipe 15 and a convex part 15b of the other sipe 15. Each shallow groove 16 has one terminal end 16a communicating with the convex part 15b of the one sipe 15, and the other terminal end 16b away from the convex part 15b of the other sipe 15. Parts x and x of each land portion sectioned on the opposite sides of the shallow groove 16 are not separated by the shallow groove 16, but partially communicate with each other through between the other terminal end 16b of the shallow groove 16 and the convex part 15b of the other sipe 15.

The concave part 15a of the sipe 15 referred here is a part of the sipe 15 protruding toward a region between the two zigzag sipes 15 and 15 adjacent in the circumferential direction T of the tire, and the convex parts 15b of the sipes 15 referred here are recessed parts of the sipes 15, when the two sipes 15 and 15 are viewed from the region. In the embodiment of FIG. 1, the shallow grooves 16 different in arrangement as described above are mixed.

There are areas where at least three sipes 15 are arranged at prescribed intervals in the circumferential direction T of the tire and the above shallow groove 16 is provide between each pair of sipes 15 and 15 adjacent in the circumferential direction T of the tire. In each of the areas, shallow grooves 16 and 16 adjacent in the circumferential direction T of the tire are offset with each other in the widthwise direction of the tire, thereby avoiding partially reducing land portion stiffness, which suppresses occurrence of uneven wear.

Figure 3:
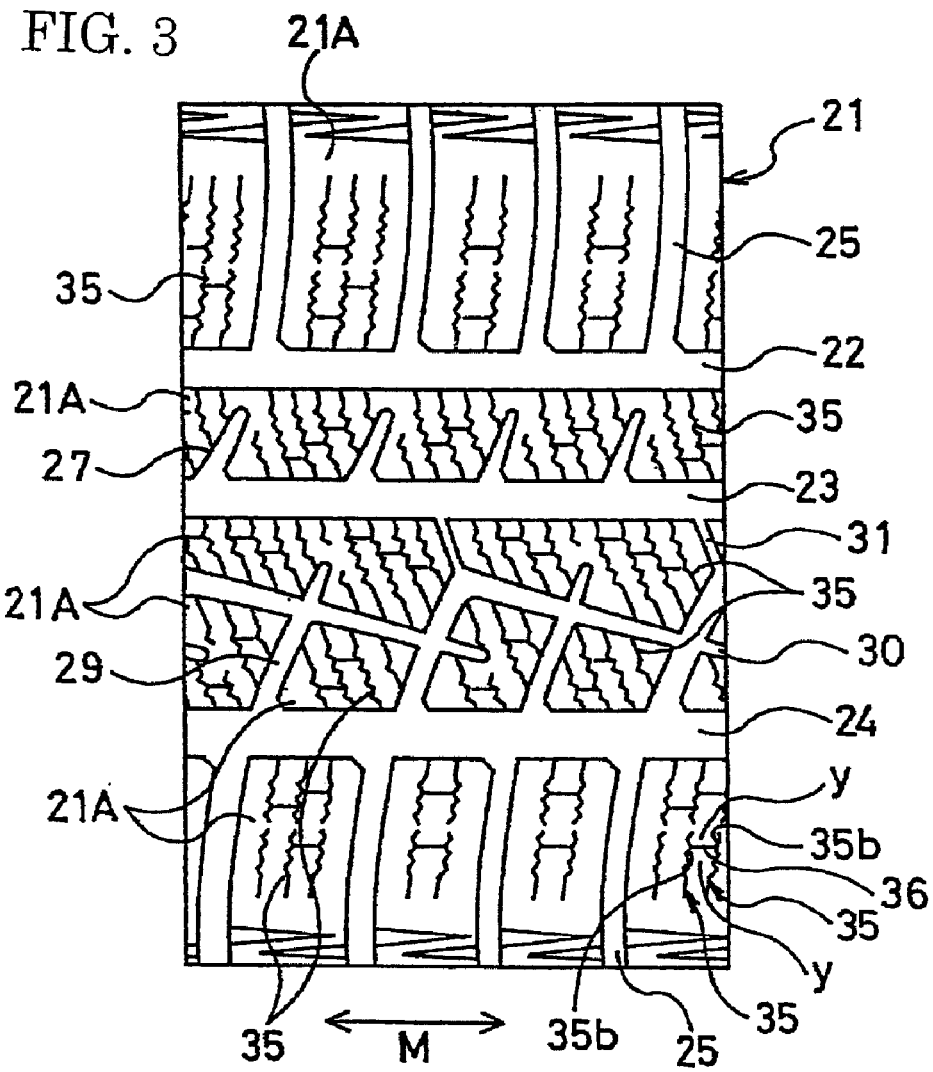
FIG. 3 is an explanatory drawing partially illustrating a tire mold used for producing the pneumatic tire of FIG. 1.

Referring to FIG. 3, there is shown a main part of a tire mold used for producing the above pneumatic tire. This tire mold is a sectional type mold, and comprises an annular upper mold section for molding one sidewall portion of the tire, an annular lower mold section for molding the other sidewall portion thereof and plurality of segments for molding the tread portion thereof which are annularly arranged between the upper and lower mold sections. FIG. 3 partially shows a molding surface of one of the segments. The molding surfaces of the other segments are the same as that of the one segment.

The segment has a molding surface 21, from which three main groove molding ridges 22, 23 and 24 extending in the circumferential direction M of the mold protrude. First lateral groove molding ridges 25, which extend from the upper and lower main groove molding ridges 22 and 24 outward in the widthwise direction of the mold (upward and downward directions in the drawing) to the design ends, protrude from the molding surface 21 at prescribed intervals in the circumferential direction M of the mold. The land portions 6 defined by the main grooves 2 and 4 and the first lateral grooves 5 in the opposite shoulder regions 1S of the tread surface 1 are formed by the main groove molding ridges 22 and 24 and first lateral groove molding ridges 25.

Second lateral groove molding ridges 27, which extend from the main groove molding ridge 23 located between the main groove molding ridges 22 and 24 toward the main groove molding ridge 22 in the widthwise direction of the mold, protrude from the molding surface 21 at prescribed intervals in the circumferential direction M of the mold. The second lateral groove molding ridges 27 do not come into contact with the main groove molding ridge 22. The land portion 8 comprising a rib having the second lateral grooves 7 disposed at the prescribed intervals is formed by the main groove molding ridges 23 and 24 and the second lateral groove molding ridges 27.

Third lateral groove molding ridges 29 and fourth lateral groove molding ridges 30 alternately protrude from the molding surface 21 at prescribed intervals in the circumferential direction M of the mold, the third lateral groove molding ridges 29 extending in a straight manner from the main groove molding ridge 24 inward in the widthwise direction of the mold (toward the main groove molding ridge 23), the fourth lateral groove molding ridges 30 extending in a bending manner from the main groove molding ridge 24 inward in the widthwise direction of the mold. A narrow groove molding ridge 31 extend between each of the fourth lateral groove molding ridges 30 and the main groove molding ridge 23. The land portions 12, 13 and 14 formed from blocks different in shape are formed between the main grooves 3 and 4 by the main groove molding ridges 23 and 24, lateral groove molding ridges 29 and 30, and narrow groove molding ridges 31.

A plurality of sipe molding blades 35, which extend in a zigzag manner in the widthwise direction of the mold, are arranged on each of molding surface sections 21A defined by the molding ridges 22, 23, 24, 25, 27, 29, 30 and 31 at prescribed intervals in the circumferential direction M of the mold. Sipe molding blades 35 provided on each of molding surface sections 21A located between the main groove molding ridges 22 and 24 extend in the widthwise direction of the mold in an inclined manner toward one side with respect to the widthwise direction of the mold. Sipe molding blades 35 provided on each of molding surface sections 21A located outwardly of the main groove molding ridges 22 and 24 in the widthwise direction of the mold extend in the widthwise direction of the mold in an inclined manner toward the other side with respect to the widthwise direction of the mold.

A shallow groove molding ridge 36 extending in a straight manner is provided between two given sipe molding blades 35 and 35 adjacent in the circumferential direction M of the mold. The shallow groove molding ridge 36 has one terminal end which is connected to one sipe molding blade 35 and the other terminal end which is away from the other sipe molding blade 35.

Figure 4:
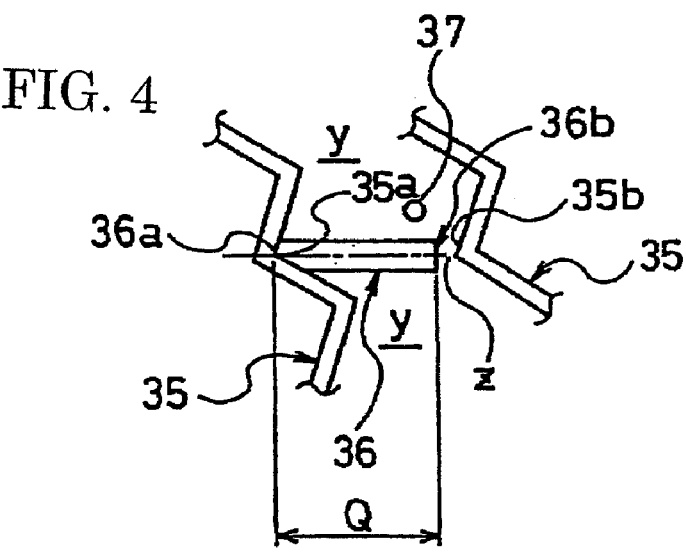
FIG. 4 is a partial enlarged view of a molding surface section of the tire mold.

More specifically, there are provided shallow groove molding ridges 36, and as shown in FIG. 4, some of the shallow groove molding ridges 36 are each disposed between a concave part 35a of one sipe molding blade 35 of the sipe molding blades 35 and 35 adjacent in the circumferential direction M of the mold, and a convex part 35b of the other sipe molding blade 35 thereof. Each shallow groove molding ridge 36 has one terminal end 36a connected to the concave part 35a of the one sipe molding blade 35, and the other terminal end 36b away from the convex part 35b of the other sipe molding blade 35. Parts y and y of each molding surface sections sectioned on the opposite sides of the shallow groove molding ridge 36 are not separated by the shallow groove molding ridge 36, but partially communicate with each other through between the other terminal end 36b of the shallow groove molding ridge 36 and the convex part 35b of the other sipe molding blade 35.

As shown in FIG. 3, the others of the shallow groove molding ridges 36 are each disposed between a convex part 35b of the one sipe molding blade 35 and a convex part 35b of the other sipe molding blade 35. Each shallow groove molding ridge 36 has one terminal end 36a communicating with the convex part 35b of the one sipe molding blade 35, and the other terminal end 16b away from the convex part 35b of the other sipe molding blade 35. Parts y and y of each molding surface section 21A sectioned on the opposite sides of the shallow groove molding ridge 36 are not separated by the shallow groove molding ridge 36, but partially communicate with each other through between the other terminal end 36b of the shallow groove molding ridge 36 and the convex part 35b of the other sipe molding blade 35.

The concave part 35a of the sipe molding blade 35 referred here is a part of the sipe molding blade 35 protruding toward a region between the two zigzag sipe molding blades 35 and 35 adjacent in the circumferential direction M of the mold, and the convex parts 35b of the sipe molding blades 35 referred here are recessed parts of the sipe molding blades 35, when the two sipe molding blades 35 and 35 are viewed from the region.

There are areas where at least three sipe molding blades 35 are arranged at prescribed intervals in the circumferential direction M of the mold and the above shallow groove molding ridge 36 is provide between each pair of sipe molding blades 35 adjacent in the circumferential direction M of the mold. In each of the areas, shallow groove molding ridges 36 and 36 adjacent in the circumferential direction M of the mold are offset with each other in the widthwise direction of the mold.

A plurality of ventholes 37 for escaping trapped air outside are provided in each molding surface sections 21A (not shown in FIG. 3, see FIG. 4). One venthole 37 is formed near a part z through which the parts y and y of each molding surface section 21A sectioned on the opposite sides of the shallow groove molding ridge 36 communicate with each other, the one venthole 37 being within a distance of 150% of the length Q of the shallow groove molding ridge 36 therefrom. If the distance where the one venthole 37 is placed is beyond 150% of the length Q of the shallow groove molding ridge 36, it is difficult to escape air trapped in the parts y and y of the molding surface section 21A outside through the one venthole 37. Therefore, it is necessary to form a further venthole. The length Q of the shallow groove molding ridge 36 referred here is a length measured on the center line thereof.

The above pneumatic tire of FIG. 1 is produced by curing a green tire in the tire mold of FIG. 3 described above.

According to the present invention described above, the shallow groove 16 extending between the sipes 15 and 15 adjacent in the circumferential direction T of the tire is disposed such that the land portion parts x and x sectioned on the opposite sides of the shallow groove 16 are not separated by the shallow groove 16, but partially communicate with each other. Therefore, it is possible to escape air trapped in the parts y and y of the molding surface section 21A sectioned on the opposite sides of the shallow groove molding ridge 36 outside from the one venthole 37 through the communicating part, that is, a communicating part z of the tire mold during curing of the tire in the tire mold. Accordingly, while occurrence of curing trouble due to an air pocket is suppressed, mold production cost can be reduced by remarkably reducing the number of ventholes 37 formed in the tire mold.

A decrease in the number of ventholes 37 can reduce the number of spews formed on the surface of the tire by rubber flown into the bentholes, whereby spew-trimming operation can be facilitated and waste from trimming can also be reduced.

It is sufficient for the land portion parts x and x to partially communicate with each other. Therefore, the shallow groove 16 can obtain an enough length. Accordingly, reduction of driving stability during turning on a wet road surface can be suppressed.

In the present invention, as shown in FIG. 2, a distance d of the part k through which the parts x and x of the land portion sectioned on the shallow groove 16 communicate with each other is preferably in the range of 5 to 20% of the length L of the shallow groove 16. If the distance d is less than 5% of the length L of the shallow groove 16, it is difficult to effectively escape trapped air during curing. If the distance d is greater than 20% of the length L of the shallow groove 16, the length of the shallow groove 16 is not sufficient, which causes reduction of driving stability during turning on a wet road surface. The length L of the shallow groove 16 referred here is a length measured on the center line of the shallow groove.

The width of the shallow groove 16 is preferably in the range of 0.3 to 2 mm. If the width of the shallow groove 16 is less than 0.3 mm, it is difficult to keep the shallow groove 16 open, which makes it difficult to provide an edge effect arising from the shallow groove 16. If the width of the shallow groove 16 is beyond 2 mm, driving stability during running on a dry road surface is reduced because of a decrease in land portion stiffness.

The depth of the shallow groove 16 is preferably equal to or less than 20% of the depths of the main grooves 2, 3 and 4 from the viewpoint of suppressing a decrease in land portion stiffness. The lower limit of the depth of the shallow groove 16 is preferably equal to or greater than 5% of the depths of the main grooves 2, 3 and 4 in terms of effective provision of an edge effect. The depths of the main grooves 2, 3 and 4 can be about 7 to 12 mm.

The angle, with respect to the circumferential direction T of the tire, of the shallow groove 16 extending in a straight manner is preferably in the range of 0 to 50 from the viewpoint of driving stability during turning on a wet road surface.

The zigzag sipes 15 may communicate with the main grooves and lateral grooves or not. The depth of each sipe 15 can be 50% to 100% of the depths of the main grooves 2, 3 and 4. The amplitude thereof can be 1.0 mm to 5.0 mm. The pitch thereof between crowing points of the zigzag can be one to four times greater than the amplitude. The distance of sipes 15 adjacent in the circumferential direction of the tire can be two to ten times greater than the amplitude. The width of the sipe can be 0.3 to 1.0 mm.

In the above-described embodiment, there are provided shallow grooves 16 each having one terminal end 16a connected to the concave part 15a of the one sipe 15 and the other terminal end 16b away from the convex part 15b of the other sipe 15, and shallow grooves 16 each having one terminal end 16a connected to the convex part 15b of the one sipe 15 and the other terminal end 16b away from the convex part 15b of the other sipe 15. However, it is preferable that, as the shallow grooves 16, only shallow grooves 16 each having one terminal end 16a connected to the concave part 15a of the one sipe 15 and the other terminal end 16b away from the convex part 15b of the other sipe 15 be provided in terms of shortening the distance away therefrom to thereby obtain the lengths of the shallow grooves 16 as long as possible while trapped air is effectively escaped.

If the distance d of the communicating part k can be secured, a shallow groove having an arrangement, opposite to the above, such that one terminal end is away from the concave part 15a of the one sipe 15 and the other terminal end is connected to the convex part 15b of the other sipe 15 may be used.

In the embodiment of FIG. 1, only the other terminal ends 16b of the shallow grooves 16 are away from the sipes 15. However, both of the opposite terminal ends 16a and 16b of the shallow grooves 16 may be away from the sipes 15. Alternatively, the communicating part k may be formed in the middle part of each shallow groove 16, or it may be formed in the middle part of the shallow groove 16 in addition to that at least on the one terminal end side of the shallow groove 16. The arrangement of the communicating part k can be properly chosen according to a tire size or a tread pattern.

The present invention is preferably applicable to pneumatic tires used for passenger cars in particular. However, there is no limitation thereto as is obvious. The present invention is also applicable to pneumatic tires having other use.

EXAMPLE

Prepared were 500 tires according to each of the present invention tires 1 and 2 and conventional tire, each having a tire size of 205/55R16, the present invention tires 1 and 2 each having a tread pattern shown in FIG. 1 and the distance d of the communicating part as shown in Table 1, the conventional tire having the same arrangement as the present invention tire 1 except that the shallow grooves had opposite terminal ends communicating with the sipes.

In each of the prepared tires, the widths of the shallow grooves are 0.8 mm, the depths thereof are 10% of the depths of the main grooves, and the angles of the shallow grooves with respect to the circumferential direction of the tire is 0°.

In each of tire molds for molding the present invention tires 1 and 2, one venthole is provided near a part through which the parts of each molding surface section sectioned on the opposite sides of a shallow groove molding ridge communicate with each other, and is located within the distance of 150% of the length Q of the shallow groove molding ridge. The ratios between the number of the ventholes of each of the tire molds for molding the present invention tires 1 and 2 and the number of the ventholes of the tire mold for molding the conventional tire are as shown in Table 1.

Evaluation for curing trouble and evaluation testing for driving stability during turning on a wet road surface (wet turning performance) were carried out on the prepared tires according to the following methods, obtaining the results shown in Table 1.

Curing Trouble

Curing trouble arising from air pockets in the tread surface of each of the 500 prepared tires was visually checked. When the occurrence percentage thereof is equal to or less than 3%, it is evaluated as good. When the occurrence percentage thereof is beyond 3%, it is evaluated as bad.

Wet Turning Performance

Tires having no curing trouble were assembled to 16×6.5 J rims, inflated to an air pressure of 230 kPa, and mounted on a passenger car (FF car) of 2000 cc displacement. Lap time was measured when the car was run drawing a circle having a radius of 30 m ten laps on a wet road surface having water thereon with a depth of 1 mm. The evaluation result thereof is represented by an index where the conventional tire is 100. As the index is greater, wet turning performance is better.

TABLE 1

|  | Conventional Tire | Present Invention Tire 1 | Present Invention Tire 2 |
| --- | --- | --- | --- |
| Distance d (%) | 0 | 10 | 15 |
| Ratio of Venthole Number | 5 | 1 | 1 |
| Curing Trouble | good | good | good |
| Wet Turning Performance | 100 | 100 | 100 |

As can be seen from Table 1, the present invention tires can maintain curing trouble and driving stability during turning on a wet road surface at the same levels as the conventional tire though the tire molds having less ventholes are used, and can prevent reduction of driving stability during turning on a wet road surface and occurrence of curing trouble.

INDUSTRIAL APPLICABILITY

The present invention having the aforementioned excellent effects is preferably applicable to pneumatic tires used for passenger cars in particular.

What is claimed is:

1. A pneumatic tire having a tread surface, land portions defined by a groove being provided in the tread surface, the groove that defines the land portions including a main groove extending in a circumferential direction of the tire, the land portions having a tread face, a plurality of sipes extending in a zigzag manner in a widthwise direction of the tire being arranged in the tread face at prescribed intervals in the circumferential direction of the tire, a shallow groove extending between sipes adjacent in the circumferential direction of the tire, the shallow groove having a width of 0.3 to 2 mm and a depth equal to or less than 20% of that of the main groove, the shallow groove being placed such that parts of the land portions sectioned on opposite sides of the shallow groove are not separated but partially communicate with each other, the shallow groove being disposed between a concave part of one sipe of the sipes adjacent in the circumferential direction of the tire, and a convex part of the other sipe thereof, the shallow groove having one terminal end communicating with the concave part of the one sipe, and the other terminal end away from the convex part of the other sipe, the parts of the land portions sectioned on the opposite sides of the shallow groove communicating with each other between the other terminal end of the shallow groove and the convex part of the other sipe, a distance of a part through which the parts of the land portions sectioned on the opposite sides of the shallow groove communicate with each other being 5 to 20% of a length of the shallow groove, the shallow groove extending in a straight manner in a range of 0 to 5° with respect to the circumferential direction of the tire, wherein the plurality of sipes include at least three sipes extending in a zigzag manner in the widthwise direction of the tire in the tread face of the land portions, the at least three sipes being arranged at prescribed intervals in the circumferential direction of the tire, the shallow groove being provided between each pair of sipes adjacent in the circumferential direction of the tire, shallow grooves adjacent in the circumferential direction of the tire being offset with respect to each other in the widthwise direction of the tire.

2. The pneumatic tire according to claim 1, wherein there is only one shallow groove between two sipes adjacent in the circumferential direction of the tire.

3. A pneumatic tire having a tread surface, land portions defined by a groove being provided in the tread surface, the groove that defines the land portions including a main groove extending in a circumferential direction of the tire, the land portions having a tread face, a plurality of sipes extending in a zigzag manner in a widthwise direction of the tire being arranged in the tread face at prescribed intervals in the circumferential direction of the tire, a shallow groove extending between sipes adjacent in the circumferential direction of the tire, the shallow groove having a width of 0.3 to 2 mm and a depth equal to or less than 20% of that of the main groove, the shallow groove being placed such that parts of the land portions sectioned on opposite sides of the shallow groove are not separated but partially communicate with each other, the shallow groove being disposed between a concave part of one sipe of the sipes adjacent in the circumferential direction of the tire, and a convex part of the other sipe thereof, the shallow groove having one terminal end communicating with the concave part of the one sipe, and the other terminal end away from the convex part of the other sipe, the parts of the land portions sectioned on the opposite sides of the shallow groove communicating with each other between the other terminal end of the shallow groove and the convex part of the other sipe, a distance of a part through which the parts of the land portions sectioned on the opposite sides of the shallow groove communicate with each other being 5 to 20% of a length of the shallow groove, the shallow groove extending in a straight manner in a range of 0 to 5° with respect to the circumferential direction of the tire, wherein there is only one shallow groove between two sipes adjacent in the circumferential direction of the tire.

* * * * *